T. C. WILLSON.
METHOD OF AND APPARATUS FOR IDENTIFYING PICTURES.
APPLICATION FILED AUG. 12, 1918.

1,337,423.

Patented Apr. 20, 1920.

Inventor
*T. C. Willson,*
By *Lee L. Townshend.*
Attorney

UNITED STATES PATENT OFFICE.

THOMAS CARROLL WILLSON, OF PHILADELPHIA, PENNSYLVANIA.

METHOD OF AND APPARATUS FOR IDENTIFYING PICTURES.

1,337,423.    Specification of Letters Patent.    Patented Apr. 20, 1920.

Application filed August 12, 1918. Serial No. 249,592.

*To all whom it may concern:*

Be it known that I, THOMAS CARROLL WILLSON, a citizen of the United States, residing at Philadelphia, in the county of Philadelphia and State of Pennsylvania, have invented certain new and useful Improvements in Method of and Apparatus for Identifying Pictures, of which the following is a specification.

This invention relates to a method of and an apparatus for identifying pictures, and it comprises a process in which a film is marked with identifying characters while passing from the film roll to the position of exposure, and a ticket bearing the same character is ejected from the machine and given to the person whose picture is to be taken, and it further comprises, as an apparatus, a camera having the usual film-roll, paratus, a camera having the usual film-roll, shutter, shutter actuating mechanism and take up roll, in combination with a roll or shaft adapted to carry a roll of tickets, means for guiding the film over the ticket roll, a light opening in the camera case, an opening for removing the ticket after it has passed the light opening, and means for guiding the ticket and film past the light opening and means for ejecting the ticket from the camera; all as more fully hereinafter set forth and as claimed.

This invention is particularly adapted for use with cameras wherein roll films are employed and a number of films are contained, in one roll. Heretofore, in using cameras of this sort, a great deal of difficulty has been experienced in identifying the negatives after a photograph has been taken. This is especially true wherein the photographs are somewhat similar as in taking pictures of similar scenes or in taking pictures of persons. Past experience has been that it has taken a great deal more time to identify the films after they are developed than the time actually consumed in taking the pictures.

In the present method the film is passed through the camera together with a ticket having perforated or transparent identifying characters. The ticket and film are guided past a light opening with the ticket on the outside of the film, and the number (or other data) is photographed on to the film by the light passing through the opening. The ticket is ejected from the machine and given to the person whose picture is to be taken. The film is then passed to the position of exposure in the ordinary manner and the photograph taken. The film is advantageously arranged so that the number will be photographed at the top or bottom and slightly spaced from the picture.

In the present apparatus I provide a camera having the usual shutter mechanism, a film roll and a ticket roll, means for guiding the film and ticket through the camera, an opening in the camera adapted to admit light, means for ejecting the ticket from the camera and a winding roll upon which the films are collected after the pictures have been taken.

In the accompanying drawings I have shown an advantageous embodiment of this invention. In this showing—

The camera is designated as a whole by the letter A and it comprises an outer casing having a hinged side 1 which may be hinged to the top or bottom of the camera. The camera is provided with the usual shutter mechanism 2 and means, shown as bulb 3, for actuating the shutter. Finder 4 is conveniently arranged near the shutter mechanism. The interior of the camera is divided into two compartments by a partition wall 5. Compartment 6 may be advantageously employed for storing films or the like.

Figure 1:
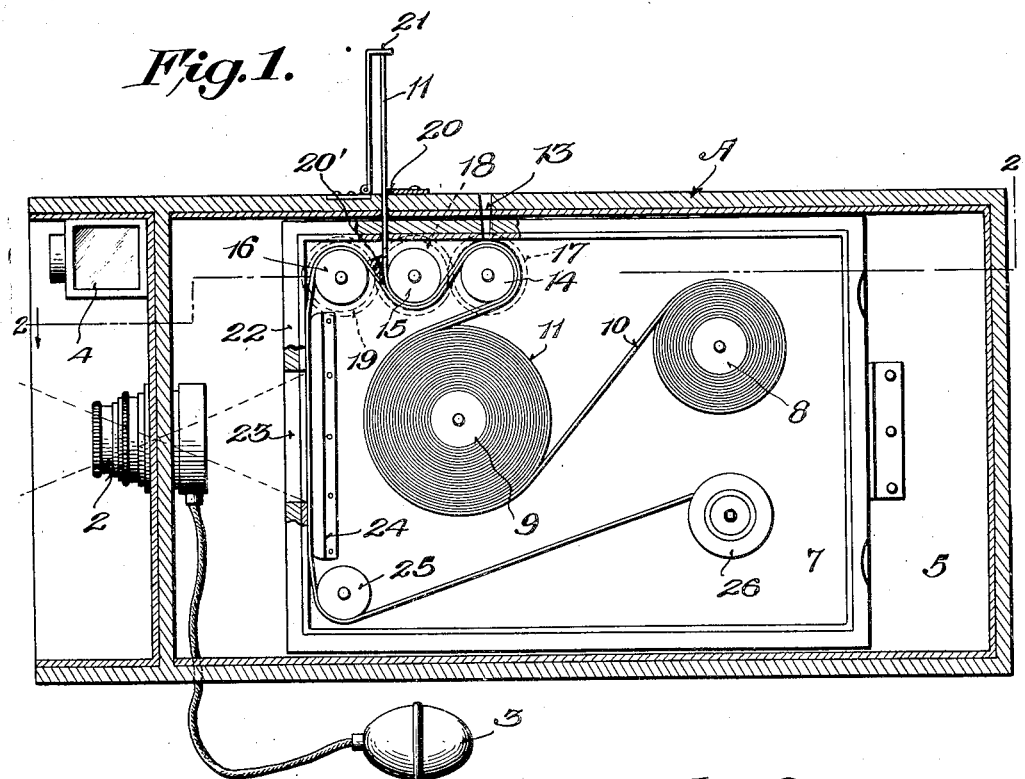
Figure 1 is a vertical sectional view through the camera.
Figure 2:
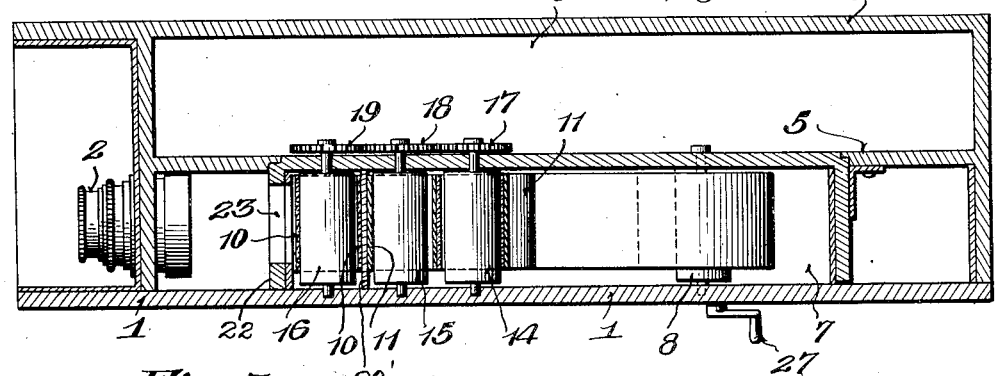
Fig. 2 is a horizontal sectional view taken on the line 2—2 of Fig. 1.
Figure 3:
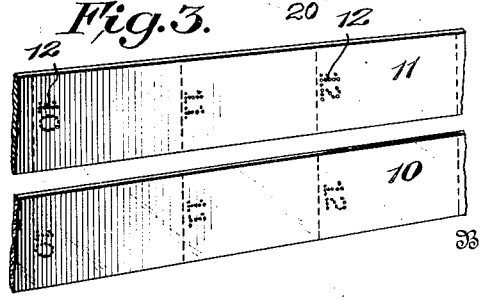
Fig. 3 is a detailed view of the ticket and film.

The other compartment 7 forms a magazine or film receptacle and is provided with a film roll 8 and a ticket roll 9. Films 10 are arranged upon the film roll and tickets 11 upon the ticket roll. The film and the ticket are shown in detail in Fig. 3. The film is of ordinary construction and is provided with a space at the top or bottom for the number or other indicating characters. The ticket may be formed of paper, cardboard, or other suitable material and is provided with perforated or transparent numbers 12. Any other suitable printed matter may be placed upon the remainder of the ticket. Between the ticket roll and the shutter mechanism the camera is provided with a light opening 13. Roll 14 is arranged beneath the light opening and suitably spaced from similar rolls 15 and 16. These rolls are journaled in the partition wall and are provided with projecting stub shafts adapted to be received in bearings in the hinged side of the camera. The rolls are provided with gears 17, 18 and 19 meshing with each other. The rolls are adapted to revolve at the same rate of speed and so arranged that alternate rollers revolve in opposite directions. A ticket-removing opening or slit 20 is formed in the camera and suitably positioned with respect to rollers 15 and 16. Wedge-block 20' is arranged beneath this opening. A hinged guide 21 may be arranged above the opening. The front of the magazine is closed by a plate 22 provided with an opening 23 registering with the shutter mechanism. A flanged guide plate 24 is placed within the magazine behind this opening. Idler roll 25 is positioned at the bottom of the camera and take up roll 26 at a convenient position in the camera. The take up roll is provided with a projecting shaft which extends through the wall of the camera and is adapted to receive a crank 27.

In operation, a roll of films and a roll of tickets are placed within the camera and the end of the film roll is guided over the ticket roll. The end of the film roll and the end of the ticket roll are then guided around rollers 14, 15, and 16. In passing over roll 14 the ticket is arranged on the outside of the film, that is between the film and the camera casing. As the ticket and film pass the light opening 13, the light projecting through the opening photographs or fogs the number of the ticket on the film. As shown the numbers are perforated into the ticket, but any means may be employed for printing the number on the face of the ticket which will render that portion of the ticket transparent. The films shown in Fig. 3 have passed the light opening in the camera and the number of the corresponding ticket has been photographed on to the film. The film is guided from the roll 14 beneath the roll 15 and the ticket is guided into position to pass out of the ticket opening 20. Wedge-block 20' serves to separate the ticket and the film and to guide the ticket toward the opening 20. If the measuring device 21 is employed the films may be turned just far enough in each case to eject the ticket and the usual indicating means arranged upon the take up roll may be dispensed with. However, under some conditions, I find it advantageous to employ the usual indicating apparatus. After the ticket has been delivered from the machine, the film is guided over roll 16 past the opening 23 in plate 22. Flanged plate 24 serves to properly guide the film past this opening. When the film is in proper position behind the opening 23 the shutter mechanism may be actuated and the picture taken in the usual manner. The distance from the point where the film and ticket separate should be a distance equal to the length of one or more tickets, so that the film corresponding to the ticket delivered will be properly positioned behind the plate 23 when the next or succeeding picture is to be taken. A provision of this sort must be made in order that the number of the film will be properly positioned at the top or bottom of the film, as the case may be, and not overlap the picture. After passing the opening 23 the film is run over idler roll 25 and wound upon the take up roll 26.

Feeding films and tickets through the machine is accomplished by means of crank 27 arranged upon the take up roll. The pull upon the film causes it to move over the rollers from the film roll to the take up roll and the tickets are fed by friction between the surface of the ticket and the surface of the film. Hinged side 1 of the camera is provided with bearings which receive the shafts of the various rollers when the camera is closed. When a ticket is delivered from the machine it is given to the person whose picture is to be taken, and the person presents the ticket when calling for the negatives or developed films. In this manner a great deal of confusion and loss of time is avoided. When a number of pictures are taken such as pictures of the members of clubs, military organizations, schools, and the like, a great deal of confusion arises when a number of the people call for films at the same time. When the present method of identifying films is employed, the films may be distributed in a very orderly manner. The films will be arranged in numerical order, and, as each person presents his ticket, the photographer can take out his film or films with very little difficulty.

What I claim is:—

1. The process of taking and identifying pictures which comprises arranging a film and a ticket having transparent indicating characters thereon within a camera having a light opening, passing said film and ticket beneath the light opening to light-print said indicating characters on to said film, ejecting said ticket from the camera and exposing said film to photograph the desired object.

2. A camera provided with a shutter mechanism, a film roll adapted to carry a roll of films, and a ticket roll adapted to carry tickets having transparent indicating characters thereon, said camera being provided with an auxiliary light opening, means for passing said film and ticket beneath said light opening with the ticket covering the film to light print said indicating characters onto said film, means for ejecting the ticket from the camera, and means for guiding the film to a position behind the shutter mechanism to photograph the desired object.

3. A camera provided with a shutter mechanism, having a film roll and a ticket roll, the ticket roll being adapted to carry tickets having transparent indicating characters thereon, a plurality of guide rollers within the camera, the camera having a light opening arranged near said guide rollers whereby said film and said ticket may be fed beneath the light opening with the ticket superimposed upon said film, means for ejecting the ticket from the camera and means for feeding the film to a position behind the shutter mechanism to photograph the desired object.

4. A camera provided with a shutter mechanism, having a film roll and a ticket roll, the ticket roll being adapted to carry tickets having transparent indicating characters thereon, the camera being provided with an auxiliary light opening and with a ticket ejecting opening, a series of guide rollers arranged beneath the light opening and the ticket ejecting opening, means for feeding the film with the ticket superimposed upon it beneath the light opening to light print the indicating characters onto the film, means for ejecting said ticket through said ticket ejecting opening, and means for feeding the film to a position behind the shutter mechanism to photograph the desired object.

In testimony whereof, I affix my signature.

T. CARROLL WILLSON.